United States Patent
Honma

(10) Patent No.: US 8,345,524 B2
(45) Date of Patent: Jan. 1, 2013

(54) INFORMATION READOUT APPARATUS

(75) Inventor: Hiromi Honma, Tokyo (JP)

(73) Assignee: NEC Corporation, Tokyo (JP)

( * ) Notice: Subject to any disclaimer, the term of this patent is extended or adjusted under 35 U.S.C. 154(b) by 500 days.

(21) Appl. No.: 12/524,024

(22) PCT Filed: Jan. 25, 2008

(86) PCT No.: PCT/JP2008/051098
§ 371 (c)(1),
(2), (4) Date: Jul. 22, 2009

(87) PCT Pub. No.: WO2008/090984
PCT Pub. Date: Jul. 31, 2008

(65) Prior Publication Data
US 2010/0103791 A1    Apr. 29, 2010

(30) Foreign Application Priority Data
Jan. 25, 2007 (JP) .................. 2007-015367

(51) Int. Cl.
*G11B 7/005* (2006.01)
(52) U.S. Cl. ............. 369/59.22; 369/124.07; 369/47.17; 369/44.32; 369/53.12
(58) Field of Classification Search .................. None
See application file for complete search history.

(56) References Cited

U.S. PATENT DOCUMENTS

| | | | | |
|---|---|---|---|---|
| 6,434,096 B1 * | 8/2002 | Akagi et al. | ............... | 369/44.32 |
| 2002/0159350 A1* | 10/2002 | Ogura et al. | ............... | 369/47.35 |
| 2003/0026185 A1* | 2/2003 | Fujiwara et al. | ............ | 369/53.15 |

FOREIGN PATENT DOCUMENTS

| | | |
|---|---|---|
| JP | 1995296386 A | 11/1995 |
| JP | 2005038494 A | 2/2005 |
| JP | 2005141868 A | 6/2005 |
| JP | 2007059018 A | 3/2007 |
| WO | 2006100981 A | 9/2006 |

OTHER PUBLICATIONS

International Search Report for PCT/JP2008/051098 mailed Mar. 11, 2008.
K. Kayanuma et al., "Eight to Twelve Modulation Code for High Density Optical Disk", International Symposium on Optical Memory 2003, Technical Digest pp. 160-161 , Nov. 3, 2003.
M. Ogawa et al., "Development of HD DVD drive technology (recording technology)", Institute of Image Information and Television Engineers Technical Report; ITE Technical Report. vol. 28. No. 43, pp. 17-20 MMS2004-38, CE2004-39 (Jul. 2004).
S. Saito et al., "Fundamental of Current Information Communication", OHM Corp., Dec. 20, 1992, p. 212-217.

* cited by examiner

*Primary Examiner* — Wayne Young
*Assistant Examiner* — Dionne Pendleton

(57) ABSTRACT

An offset corrector of an information readout apparatus receives a digital signal DRF output from an A/D converter, and performs offset correction. The offset corrector is capable of switching between a level-correction operation that corrects the offset so that the DC level of the shortest period signal included in the readout signal assumes a zero amplitude reference and a HPF operation that matches the level of the readout signal with the zero amplitude reference. The offset corrector corrects the offset in the level correction operation during a normal reproduction, and switches to the HPF operation for offset correction when a defect judgment unit detects a defective area. The information readout apparatus is stable and has a superior performance without a symmetry deviation if there occurs a waveform fluctuation caused by a defect etc.

10 Claims, 9 Drawing Sheets

INFORMATION READOUT APPARATUS

This application is the National Phase of PCT/JP2008/051098, filed Jan. 25, 2008, which is based upon and claims the benefit of priority from Japanese patent application No. 2007-015367 filed on Jan. 25, 2007, the disclosure of which is incorporated herein in its entirety by reference.

TECHNICAL FIELD

The present invention relates to an information readout apparatus and, more particularly, to an information readout apparatus including an offset corrector that corrects an offset of a readout signal.

BACKGROUND ART

Along with a recent development of multimedia presentation, it is required to process a large amount of information including video information. It is also required for a storage device storing therein the information to have a larger capacity. In the field of storage device that stores therein a high-image-quality video information in particular, a capacity larger than the capacity of the current DVD is desired. However, for achieving a larger storage capacity, it is needed for an optical disk drive or HDD unit to increase the storage density. Thus, for increasing the storage density, it is a crucial issue to reduce the error rate and assure the reliability. To address this issue in the optical disk, there are roughly three approaches that have been investigated: a media composition approach; an optical approach; and a signal processing approach. The following description relates mainly to the signal processing approach.

The optical disk drive irradiates a laser beam focused by an optical element onto a disk medium, to detect information based on the brightness and darkness or polarization of the light reflected therefrom. Since the focused beam spot is infinite and a smaller diameter thereof enables a higher density recording/reproducing, the optical approach for reducing the beam spot has been developed. The spot diameter is inversely proportional to the NA (numerical aperture) of an objective lens, and is proportional to the wavelength, $\lambda$, of the laser beam. Therefore, a larger NA and a smaller $\lambda$ can provide a smaller spot diameter. However, a larger NA reduces the depth of focus, to necessitate a smaller distance between the disk surface and the lens, and thus there is a limit thereon. On the other hand, although a shorter wavelength laser has a problem on the stability upon lasing at a higher output power and on the lifetime thereof, the reduction of the wavelength has been gradually advancing from an infrared laser ($\lambda$=780 nm) for a CD, through a red laser ($\lambda$=650 nm) for a DVD, to a blue laser ($\lambda$=405 nm) for the next-generation DVD.

Here, the frequency characteristic of a transmission path between the optical head and the disk medium is in the form of a LPF (low-pass filter) in which the gain of a higher frequency range reduces due to the finite beam spot. Accordingly, a rectangular wave, if recorded, will have a dull waveform. In addition, a higher recording density, if employed, incurs an intersymbol interference wherein a waveform to be read at a specific time instant interferes with another waveform to be read at another time instant. The intersymbol interference makes it difficult to reproduce a recorded mark having a length smaller than a specific length. On the contrary, in consideration of the case of a longer recorded mark, the resultant reduction in the frequency of outputs of the phase information, which are used for extracting a synchronizing clock, may incur a loss of synchronization, and accordingly, the length of the recorded mark must be limited to below a specified length.

Due to the reasons as described heretofore, the signal processing approach is such that the data to recorded onto the optical disk is encoded for recording. In particular, a RLL code (run-length-limited code) that restricts the interval between code inversions is mostly used, and especially ETM (eight to twelve modulation), EFM (eight to fourteen modulation), (1,7)RLL, 8/16 codes etc. are typically used. The minimum run-length in the EFM-modulated code used for the CD and the 8/16-modulated code employed for the DVD, among others, is 2 (d=2), whereas the maximum run-length in the (1,7)RLL and ETM-modulated codes is "1". The ETM is (1,10)RLL code in which the code rate is ⅔ similarly to (1,7) RLL, as described in "Eight to Twelve Modulation Code for High Density Optical Disk", Kinji Kayanuma et al., International Symposium on Optical Memory 2003, Technical Digest pp. 160-161, Nov. 3, 2003. This features a restriction of the number of continued shortest marks in a row and a compression performance of the DC (direct current) component.

There is a technique referred to as waveform equalization. This reduces the error rate by inserting a reverse filter that removes the intersymbol interference. Since this equalization emphasizes the high-frequency component of the readout signal, the intersymbol interference can be suppressed; however, there may be a case where the high-frequency component of noise is also emphasized to thereby degrade SNR (signal to nose ratio) of the readout signal. In particular, in the case of higher recording density, the degradation of SNR caused by this waveform equalization is the main factor of occurring of an error in the detection data. A PR (partial response) equalization is one of the waveform equalization techniques that intentionally generates the intersymbol interference. Usually, it does not intensify the high-frequency component, whereby the degradation of SNR can be suppressed.

On the other hand, there is a maximum-likelihood detection technique among the effective detection techniques. This technique is one that raises the detection performance by selecting a pattern that provides a least square mean value of errors out of all the possible time-series patterns. Note that an algorithm referred to as the Viterbi algorithm is generally used to achieve the processing by performing a progressive path selection, because the above processing is generally difficult to achieve in the practical circuitry due to restriction of the circuit scale and operational speed.

A detection technique that combines the Viterbi detection with the above PR equalization is referred to as PRML (partial-response maximum-likelihood) technique, and can detect data while performing a sort of error correction. The PR equalization allows the readout signals to have correlation therebetween in the time direction. Thus, the data series sampled from the readout signal have only limited specific state transitions. By comparing the limited state transitions against the data series of the actual readout signal including noise to select a state transition that is most likely, occurring of an error in the detection data can be suppressed. The PRML detection technique using the ETM code and PR (1,2,2,2,1) channel is described in "Development of HD DVD technique (recording technique)" by Ogawa, Honma et al., Institute of Image Information and Television Engineers Technical Report, ITE Technical Report, Vol. 28, No. 43, PP. 17-20 MMS2004-38, CE2004-39 (July 2004). This technique achieves a wider detection margin during reproduction of a high density recording.

For improving the detection performance in the Viterbi detection, it is needed to match the frequency characteristic of the reproduced channel with the specific PR equalization characteristic. In this case, a PR equalization characteristic that is most close to the reproduced channel is selected, and in general, the frequency characteristic is corrected using the waveform equalizer, to be close to the PR characteristic as much as possible. As a technique for adaptively correcting the time-dependent degradation of the signal to thereby improve the detection performance, there is an automated equalization or adaptive equalization technique. A successive adaptive equalization algorithm is described in "Fundamental of Current Information Communication" by Shuzo Saito etc. from OHM corp., Dec. 20, 1992, pp 212-217, and includes typically "Zero Forcing Technique" and "Mean Square Technique" etc. The adaptive equalization technique has the advantage that initializing adjustment of the device is not needed and so on, to operate with a higher effectiveness.

In the mean time, a DC fluctuation of the readout signal degrades the detection performance in other detection techniques as well as the Viterbi detection. Usually, for compensating this degradation, the detection processing is performed after using a HPF (high-pass filter) etc. to correct a DC deviation. However, if there is a deviation in the symmetry of the readout signal, passing through the HPF does not match the polarity inversion level with the zero reference level. For the case where the readout signal is subjected to a threshold detection using a zero threshold value, a technique referred to as automated slicer is used wherein the threshold value is controlled by integrating the binary data to allow the duty thereof have an average of zero. This technique is described as an example of the conventional technique in Patent Publication JP-1995-296386A.

The above automated slicer will be described with reference to FIG. 9. A readout signal detected by an optical pickup passes through an amplifier etc. not shown, and is subjected to removal of the DC component thereof in a DC-cut section configured by a capacitor 30. The detected voltage from which the DC component has been removed is subjected to binarization in a comparator 31. As described before, the data recorded on the optical disk is substantially free from the DC component due to a variety of modulations. Thus, if the slice level in the comparator is adequate, the output of integration of the results of comparison assumes zero. On the other hand, since the readout signal has a limited frequency band due to the frequency characteristic between the optical head and the medium, there arise a deviation in the duty if the slice level is deviated, whereby the output of integration of the results of comparison can be detected as a value that has a polarity depending on the deviation of the slice level and the polarity. Thus, a resistor 32 and a capacitor 33 are used for integration, and the slice level is fed back to the comparator 31 via a buffer 34, and controlled automatically to an adequate slice level.

A technique for correcting the deviation of DC level and suited to a digital configuration is described in Patent Publication JP-2007-059018A. This technique will be described with reference to FIG. 10. A readout signal is A/D-converted in an A/D converter 10 at the timing of a clock signal output from a PLL circuit 16, and delivered to a Viterbi detector 13 via an offset corrector 20 and an equalizer 12. An error-signal generator 115 generates an equalization error based on the detected data from the Viterbi detector 13 and the output from the equalizer 12. The error-signal generator 115 outputs to the offset corrector 20 an equalization error, which is in the vicinity of polarity inversion of the readout signal, out of the equalization errors generated therein. The offset corrector 20 integrates the equalization errors in the vicinity of the polarity inversion of the readout signal, to control the offset amount so that the integrated value assumes zero. Since the deviation of DC level is directly added to the equalization error, an offset correction can be achieved with a higher accuracy at a higher speed. This allows the Viterbi detector 13 to exercise the detection performance thereof at a maximum.

Since the readout signal in a detection system that requires a most-likelihood detector has a lower resolution or lower SNR, a large amount of noise is added thereto in the form of jitter. Thus, for detecting the slice level with a higher accuracy from the result of slicing in JP-1995-296386A, a long-time integration is needed. This incurs the problem that the accuracy of the slice level or the control band is impaired. In addition, upon configuration of a digital circuit, it is needed to increase the sampling rate of the A/D conversion for raising the time resolution, and to employ a larger number of quantization bits.

On the other hand, use of the technique described in JP-2007-059018A solves the problem of the tracking accuracy and tracking bandwidth of the offset. However, the readout signal from the optical disk is involved with a damage or dust on the medium surface and a minute defect etc. on the recording layer without an exception. In general, these defective areas appear together with a reduction in the amplitude or DC-level fluctuation in the readout signal. In the information detector described in JP-2007-059018A, a deviation of the sampling phase may occur upon passing through the defect. The most-likelihood detector, which performs detection operation on the premise that the sampling phase is correct, detects wrong detection data in the state of deviation of the sampling phase. If the thus detected data is used to generate the error information for the offset correction, the deviation of the DC level is accelerated. This deviation of DC level is fed back to the phase comparator in the PLL, to accelerate the deviation of the sampling phase. As a result, as exemplified in FIG. 11, the deviation of DC level occurs just after passing through the defect, to stabilize the phase deviation at $\pi$. Thus, the defect that can be originally corrected using the ECC without a problem eventually appears as a burst error that cannot be corrected.

JP-2007-059018A describes that, after performing judgment as to synchronization of the PLL, the offset correction operation is held or initialization is performed if out-of-synchronization is judged. However, if the SNR of readout signal is lower, it is difficult to judge the synchronous state in a short period of time from the state of phase comparison in the PLL. Thus, it is general to use the interval between the synchronizing flags, for example, in the detected data pattern as an index, whereby the judgment as to the synchronization consumes a significant time period. This time lag causes a large number of errors during the holding or initialization operation. In addition, even if the judgment is performed within the time limit, there is no guarantee that the sampling phase is correct after returning to the ordinary control, thereby causing a possibility of deviation of the DC level. In short, there is a problem in the stability against the deviation of PLL phase or DC level after passing through the defect.

SUMMARY OF THE INVENTION

It is an object of the present invention to solve the problems in the conventional techniques and to provide an information readout apparatus that is stable even in the state of occurring of a waveform fluctuation due to a defect etc., and has a superior performance even in the case of occurring of a deviation of the symmetry.

The present invention provides an information readout apparatus that identifies binary data by using a maximum-likelihood detection from a readout signal read from an optical information medium, the apparatus including: an offset corrector that receives the readout signal, and is capable of performing a HPF (high-pass filter) operation that controls an offset of the readout signal so that a DC level of the readout signal assumes a zero amplitude reference, and a level-correction operation that controls an offset of the readout signal so that a DC level of the shortest period signal included in the readout signal assumes a zero amplitude reference, while switching therebetween; a maximum-likelihood detector that identifies the binary data from the readout signal for which the offset was controlled by the offset corrector; a defect judgment unit that detects a disturbance of the readout signal based on a change of an envelope of the readout signal; and a gate-signal generator that generates a switching signal for switching operation of the offset corrector based on a result of waveform disturbance detected by the defect judgment unit.

The above and other objects, features and advantages of the present invention will be more apparent from the following description, referring to the accompanying drawings.

DESCRIPTION OF THE EMBODIMENT

Figure 1:
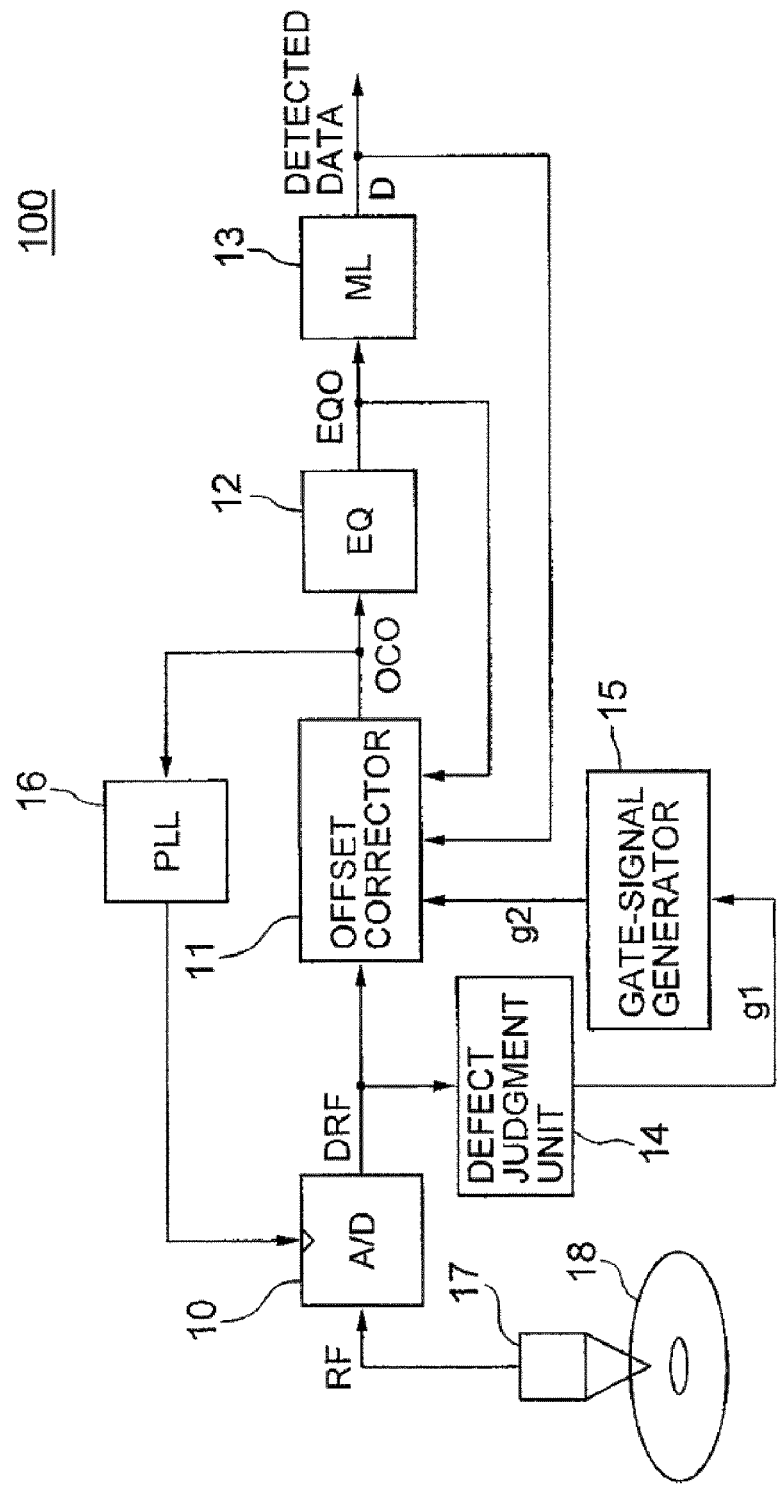
FIG. 1 is a block diagram showing the configuration of an information readout apparatus according to an embodiment of the present invention.

Hereinafter, an exemplary embodiment of the present invention will be described with reference to the drawings. FIG. 1 shows the configuration of an information readout apparatus according to an embodiment of the present invention. The information readout apparatus 100 includes an A/D converter 10, an offset corrector 11, an equalizer (EQ) 12, a maximum-likelihood detector (ML: Viterbi detector) 13, a defect judgment unit 14, a gate-signal generator 15, a PLL circuit 16, and an optical pickup 17. The optical pickup 17 irradiates a focused beam onto the information recording surface of an optical disk medium 18, and converts the reflected light into an analog electric signal (readout signal). The focused beam irradiated by the optical pickup 17 is correctly positioned in the focusing direction and tracking direction with respect to the disk surface by an actuator servo not illustrated.

The readout signal from the optical pickup 17 is amplified by a preamplifier not illustrated, and subjected to a high-frequency-band boost equalization and a band limiting processing by an analog filter, to be input to the A/D converter 10 as a readout RF signal. The A/D converter 10 converts the readout RF signal into a digital signal DRF. The digital signal DRF is corrected in the offset thereof by the offset corrector 11, and input to the PLL circuit 16.

The offset corrector 11 is configured to perform switching between a HPF operation that controls the offset of DC level of the readout signal to a zero amplitude reference and a level correction operation that controls the offset of DC level of the shortest period signal included in the readout signal to the zero amplitude reference. More concretely, the configuration is such that two separate systems including a HPF circuit and a level correction circuit are provided therein and are switched therebetween by a selector. In an alternative configuration, the HPF circuit and level correction circuit may be cascaded in this order, and the level correction circuit is ON/OFF controlled.

The PLL circuit 16 generates a sampling clock of the A/D converter 10 based on the offset-corrected digital signal (OCO) output from the offset corrector 11. The phase comparator and loop filter in the PLL circuit 16 are configured by digital circuits. In the PLL circuit 16, after D/A conversion of the output of the loop filter for converting the output of the loop filter into an analog voltage, the VCO oscillation frequency is controlled. In an alternative, a perfect-digital interpolation PLL may be employed wherein an interpolator is provided, the A/D converter 10 is allowed to sample at a fixed frequency, and the PLL circuit 16 controls the phase of interpolation.

The equalizer 12 receives the output signal OCO of the offset corrector 11, and equalizes the input OCO signal so that the OCO signal approaches as much as possible to a specific PR channel determined by the next-stage Viterbi detector 13. It is possible to configure the equalizer 12 by a FIR filter and employ an adaptive equalization configuration wherein each tap coefficient is controlled based on a LMS algorism so that the equalization error signal and the input of the equalizer have a zero correlation therebetween. Note that if the resolution capability and SNR of the input signal are not changed significantly, a filter having a fixed tap may be used. In addition, if the readout signal can be made matched with a desired PR channel by an analog-boost equalization at the preceding stage of the A/D converter 10, the equalizer 12 may be omitted.

The Viterbi detector 13 performs a maximum-likelihood detection to detect a more-likely binary data train in comparison thereof against the PR channel characteristic based on the digital signal (EQO) that is PR-equalized by the equalizer 12. Instead of the Viterbi detection, another maximum-likelihood detection may be employed that selects a path that is more likely among all the other possible fixed-length data paths. The detected data D output from the Viterbi detector 13 is subjected to an error correction processing after RLL-modulation thereof.

The defect judgment unit 14 judges presence or absence of a disturbance in the waveform based on the digital signal DRF output from the A/D converter 10. In this judgment, if the envelope of the digital signal DRF is changed, or if the amplitude is abruptly lowered in particular, occurring of the waveform disturbance is judged. The defect judgment unit 14 informs the presence or absence of the waveform disturbance to the gate-signal generator 15 by using the output signal. The defect judgment unit 14, if it judges occurring of the waveform disturbance, shifts the output signal g1 thereof from a L-level to a H-level, for example, thereby informing the occurring of waveform disturbance to the gate-signal generator 15.

The gate-signal generator 15 outputs a signal g2 (switching signal), which is to be input to the offset corrector 11, based on the output signal g1 of the defect judgment unit 14. The gate-signal generator 15, upon receiving the information of occurring of the waveform disturbance, shifts the output signal g2 from a L-level to a H-level to leave thereat during a specific time length from the start of detection timing of the disturbance or passing timing of the defect. The offset corrector 11 performs a level-correction operation during the L-level period of signal g2, and switches the operation to a HPF operation in the H-level period of signal g2. In FIG. 1, although the defect judgment unit has a digital circuit configuration in consideration of the advantage for integration to a LSI, the defect judgment itself may be realized by an analog circuit that receives an analog RF signal.

Figure 2:
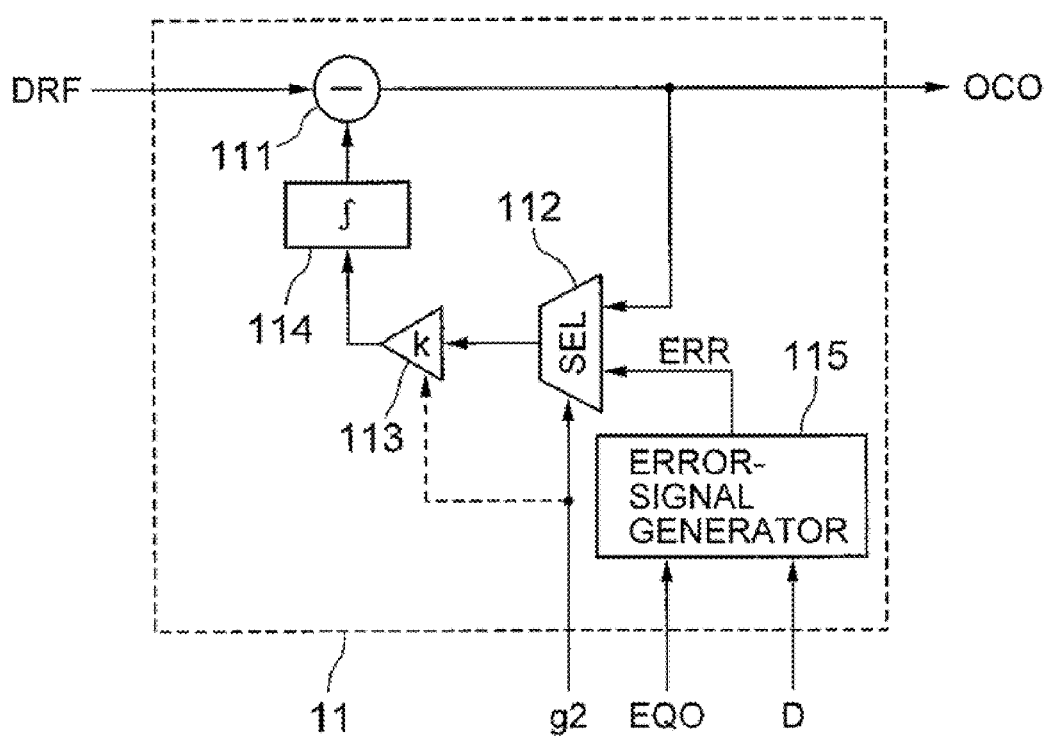
FIG. 2 is a block diagram showing a configuration of the offset corrector.

FIG. 2 shows a configuration of the offset corrector 11. The offset corrector 11 outputs a value obtained by subtracting from the input digital signal DRF in a subtractor 111 an offset amount output from an integrator 114. A selector 112 selects the output signal OCO of the offset corrector 11 when signal g2 output from the gate-signal generator 15 assumes a H-level, whereby a value obtained by multiplying the signal OCO by a fixed gain coefficient K in a multiplier 113 is input to the integrator 114. In this state, a feedback control is effected in the offset corrector 11 so that the DC component of the offset correction signal OCO assumes zero, whereby the offset corrector 11 performs a primary HPF operation.

On the other hand, when signal g2 output from the gate-signal generator 15 assumes a L-level, the selector 112 selects the output of the error-signal generator 115. The error-signal generator 115 generates an error signal ERR with respect to the DC level of the shortest period signal in the readout signal based on the detected data D (binary data) output from the Viterbi detector 13 and the signal EQO output from the equalizer 12. This error signal ERR passes through the multiplier 113, integrator 114 and subtractor 111, to be output as the output signal OCO of the offset corrector 11. In this state, the change of output signal OCO of the offset corrector 11 is fed back to the output signal EQO of the equalizer 12, whereby a closed loop including the PRML is configured so as to control the average value of the error signal ERR to assume zero. That is, a level-correction operation is effected.

Since the offset corrector 11 having the configuration shown in FIG. 2 uses the subtractor 111, integrator 114 and multiplier 113 in common to both the HPF operation and level-correction operation, there is an advantage that the circuit is realized in a relatively smaller circuit scale. The multiplier factor K of the multiplier 113 can be switched by the timing switching signal g2. In this case, the HPF operation and level-correction operation may be effected in different cut-off frequencies.

Figure 3:
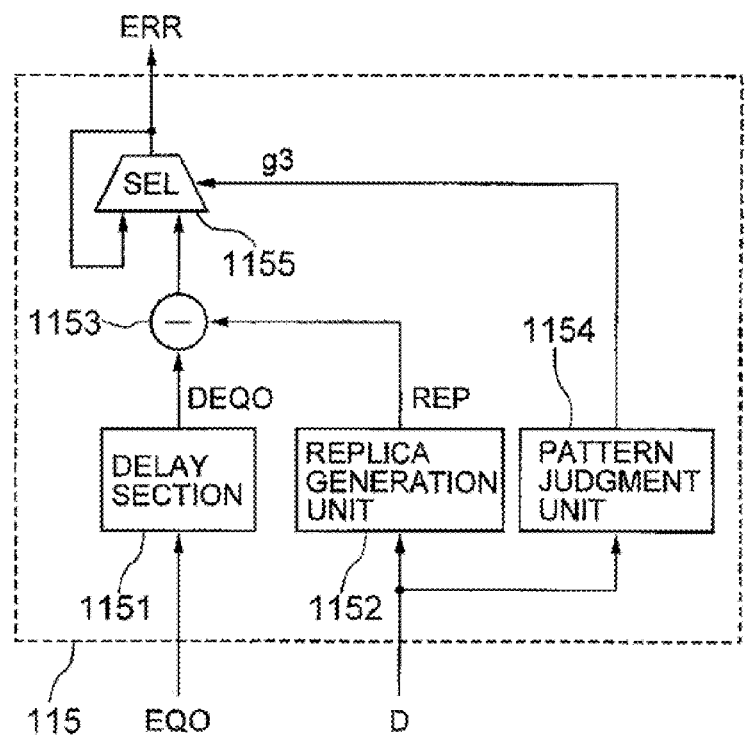
FIG. 3 is a block diagram showing an exemplified configuration of the error-signal generator.

FIG. 3 shows an exemplified configuration of the error-signal generator. A replica generation unit 1152 generates a replica data train (multi-value data) REP, which is equivalent to the input of the Viterbi detector 13 corresponding to the detected data D, based on detected data D (binary data). Assuming that a H-level and a L-level in the detected data D are represented by "1" and "−1", respectively, that the detected data D at a time instant "i" is represented by Di, and that the Viterbi detector 13 operates while specifying PR(1, 2, 2, 1), the impulse response in this case provides P0=1, P1=2, P2=2, P3=1, and Pi=0 (i<0, and i>3). The replica data value REPi at time instant "i" is calculated by the following convolution calculation:

$$REPi = \Sigma Di+j \times Pj$$

A delay section (delay gate) 1151 delays output signal EQO of the equalizer 12, which is an input signal of the Viterbi detector 13, by a time length corresponding to the internal delay time of the Viterbi detector 13. By delaying the signal EQO by the time length corresponding to the internal delay time of the Viterbi detector 13 in the delay section 1151, the output signal DEQO of the delay section 1151 and replica signal REP have an equal phase. The subtractor 1153 outputs a difference, i.e., the equalization error, between the REP output from the replica generation unit 1152 and the DEQO output from the delay section 1151.

A pattern judgment unit 1154 distinguishes a pattern having the shortest period length (3T in a DVD) based on the detected data D. The pattern judgment unit 1154 generates a gate signal g3 that assumes a H-level at a timing corresponding to the shortest period length, for example, and assumes a L-level at the other period. A selector 1155 selectively outputs the equalization error generated by the subtractor 1153 depending on the level of the gate signal g3. For example, when the gate signal g3 assumes a H-level, i.e., at the timing corresponding to the shortest period length, the equalization error generated by the subtractor 1153 is selectively output as the error signal ERR.

A selector 1155 holds the error signal ERR to the latest value, without delivering the equalization error, if the gate signal g3 assumes a L-level, i.e. if the pattern of the detected data D does not match the pattern of the shortest period length. In an alternative, the error signal ERR may be set at "0", if the gate signal g3 assumes a L-level. However, it is preferable to hold the error signal ERR to the latest value if the pattern does not match the shortest period length, because the gain of the closed loop is changed by the frequency of appearances of the pattern if the error signal ERR is set at "0". Since the equalization error in the vicinity of an edge matches the DC level of the shortest period length, the pattern judgment unit 1154 may distinguish the edge portion of the pattern or a preceding and succeeding patterns of around 1T-length including the edge portion and then output the error signal ERR at this timing, if the frequency of appearances of the shortest period length is lower in the readout signal.

Figure 4:
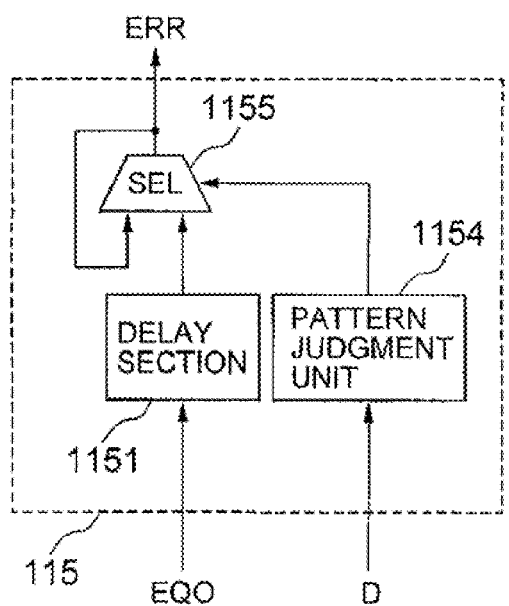
FIG. 4 is a block diagram showing another exemplified configuration of the error-signal generator.

In the above description, the equalization error at the timing corresponding to the shortest period length is used as the error signal ERR. In an alternative, an error-signal generator 115 having the configuration shown in FIG. 4 may be used, wherein the selector 1155 selectively delivers the value of output signal EQO of the equalizer 12 in the vicinity of the edge as the error signal ERR. In FIG. 4, the operation of the delay section 1151 and pattern judgment unit 1154 is similar to that of the configuration shown in FIG. 3. It is preferable, however, to use the configuration of FIG. 3 and selectively output the equalization error, because the SNR during detection of the DC level is higher to thereby achieve a higher tracking accuracy.

Figure 5:
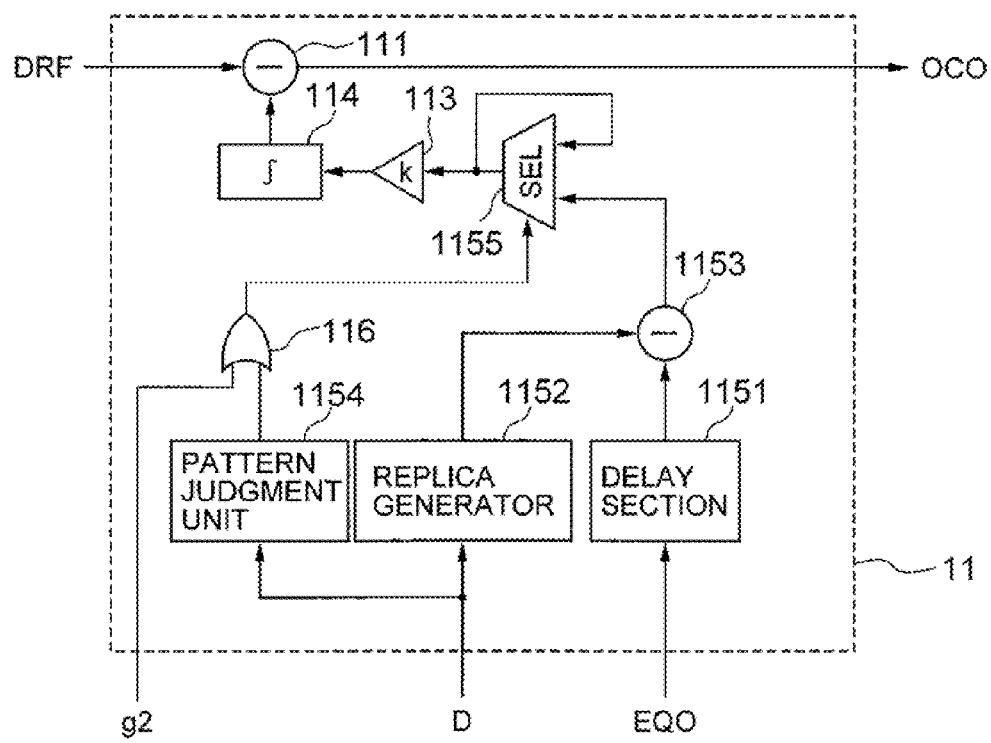
FIG. 5 is a block diagram showing another configuration of the offset corrector.

FIG. 5 shows another exemplified configuration of the offset corrector. In this configuration, during the level-correction operation, the equalization error signal is selectively output from the selector 1155 depending the judgment result of the pattern judgment unit 1154, and integrated to control the offset deviation, similarly to FIG. 3. On the other hand, during the HPF operation, the selector 1155 is controlled by an OR circuit 116 to output the equalization error signal at any time, without feed-back of the output OCO of the offset corrector 11. In this way, during the HPF operation, the offset is controlled so that the average value of the equalization error of all the timings assumes zero instead of the equalization error of the specific pattern timing. Since the equalization error of each timing is superimposed with the offset deviation at that timing, control of this equalization error to assume zero is equivalent to the HPF operation.

Figure 6:
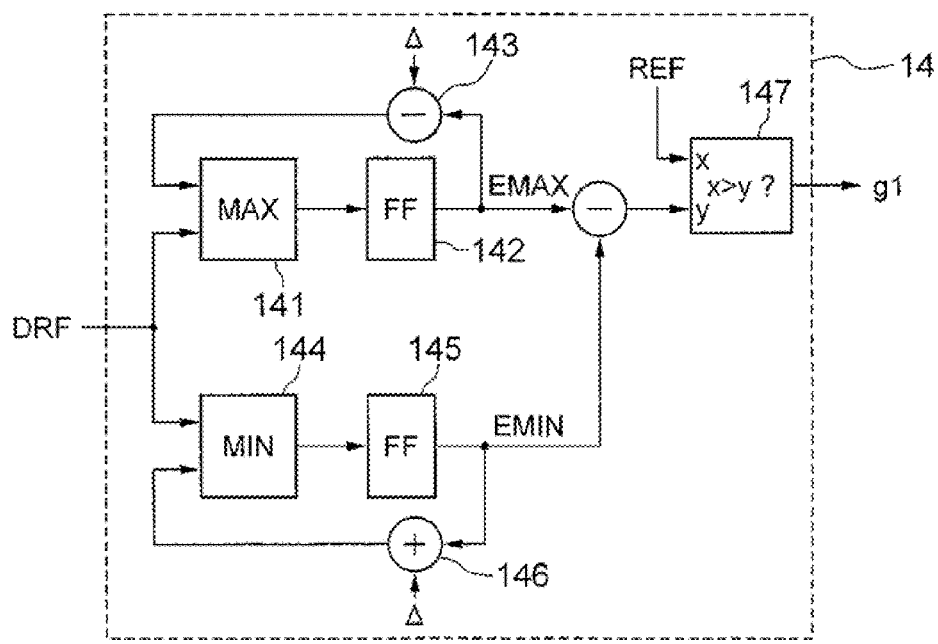
FIG. 6 is a block diagram showing the configuration of the defect judgment unit.

FIG. 6 shows the configuration of the defect judgment unit 14. A maximum-value selector 141 receives a digital signal DRF and a value output from the subtractor 143, to output a maximum value of those. The value output from the maximum-value selector 141 is temporarily held by a register 142, is subjected to subtraction of a fixed value Δ therefrom in the subtractor 143, and then fed back to the maximum-value selector 141. In this way, the maximum value in the past is not always held, whereby a maximum envelope EMAX of the digital signal DRF can be detected.

Similarly, a minimum-value selector 144 receives the digital signal DRF and a value output from an adder 146, to output a minimum value of those. The minimum value output from the minimum-value selector 144 is temporarily held by a register 145, subjected to addition of the fixed value Δ thereto in an adder 146, and fed back to the minimum-value selector 144. In this way, the minimum value in the past is not always held, whereby a minimum envelope EMIN of the digital signal DRF can be detected.

A comparator 147 compares the difference between the maximum envelope EMAX and the minimum envelope EMIN against a reference value REF, and performs value judgment of the difference between the EMAX and the EMIN. The difference between the EMAX and the EMIN is equivalent to the amplitude of the digital signal DRF, which is significantly changed in the defective area. If the difference between the EMAX and the EMIN is below the reference value REF, a comparator 147 shifts the output signal g1 from a L-level to a H-level, for example, to inform the occurrence of a waveform disturbance to the gate-signal generator 15.

Figure 7:
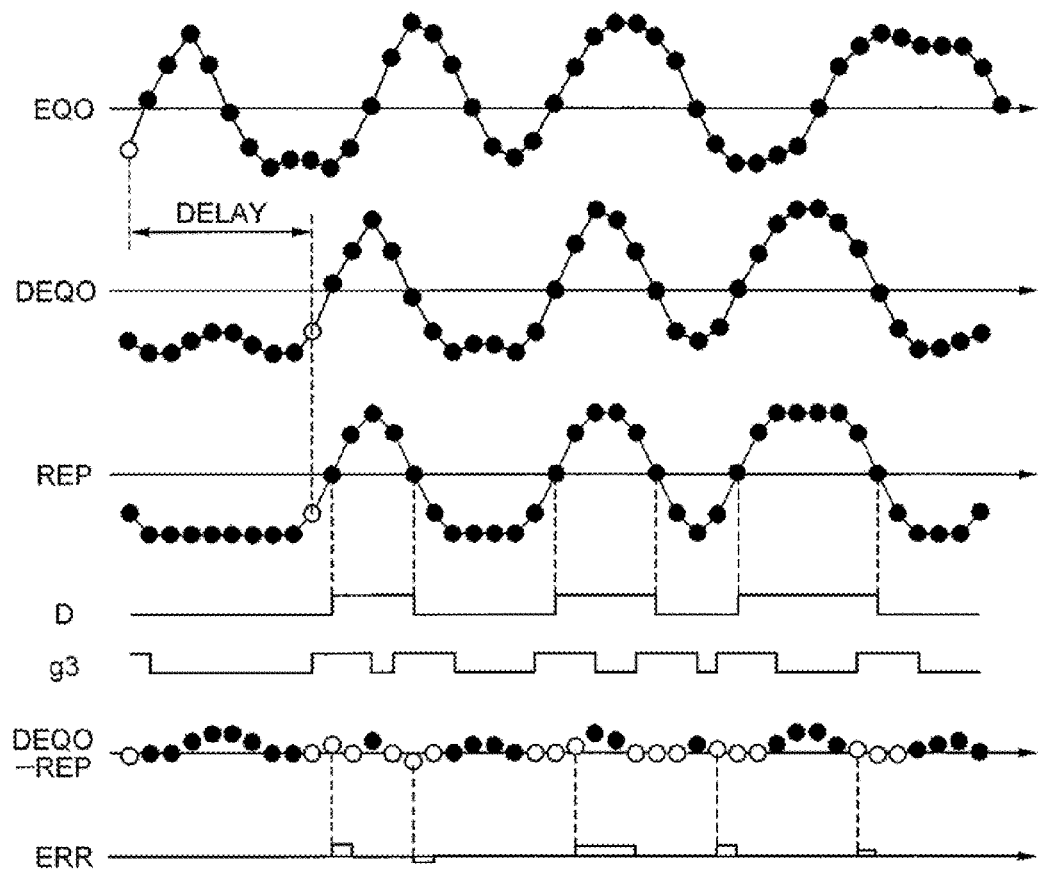
FIG. 7 is a waveform diagram showing waveforms during operation of the error-signal generator.

Hereinafter, operation of each section in the information readout apparatus 100 will be described in detail. FIG. 7 shows the operational waveform of each section in the error-signal generator 115. It is assumed here that the information readout apparatus 100 detects the readout RE signal read from a DVD by using a Viterbi detection of the PR (1,2,2,1) channel. The delay section 1151 (FIG. 3) adds a delay equivalent to the internal delay time of the Viterbi detector 13 to the output EQO of the equalizer 12, which is the input data of the Viterbi detector 13, to generate DEQO. The replica generation unit 1152 performs convolution of the impulse response ( . . . 0,1,2,2,1,0,0 . . . ) into the detected data D output from the Viterbi detector 13, to generate the replica signal REP. The subtractor 1153 outputs the difference (equalization error: DEQO−REP) between the signal DEQO delayed by the delay section 1151 and the replica signal REP.

The pattern judgment unit 1154 generates the signal g3, which assumes a H-level at the polarization change timing (replica signal REP=0) and before and after the same (replica signal REP=±4) based on the detected data D. The selector 1155 outputs an equalization error during the H-level period of signal g3, i.e., at the timing at which the replica signal REP assumes "0" and "±4", from among the equalization errors (DEQO−REP) output from the subtractor 1153, as the error signal ERR. In FIG. 7, a blank circle shows the equalization error which is output as the error signal ERR among the equalization errors. Due to operation of the closed loop system so that the integration of this error signal ERR assumes zero in the offset corrector 11 (FIG. 2), the DC level of the shortest period can be matched with the amplitude reference.

Figure 8:
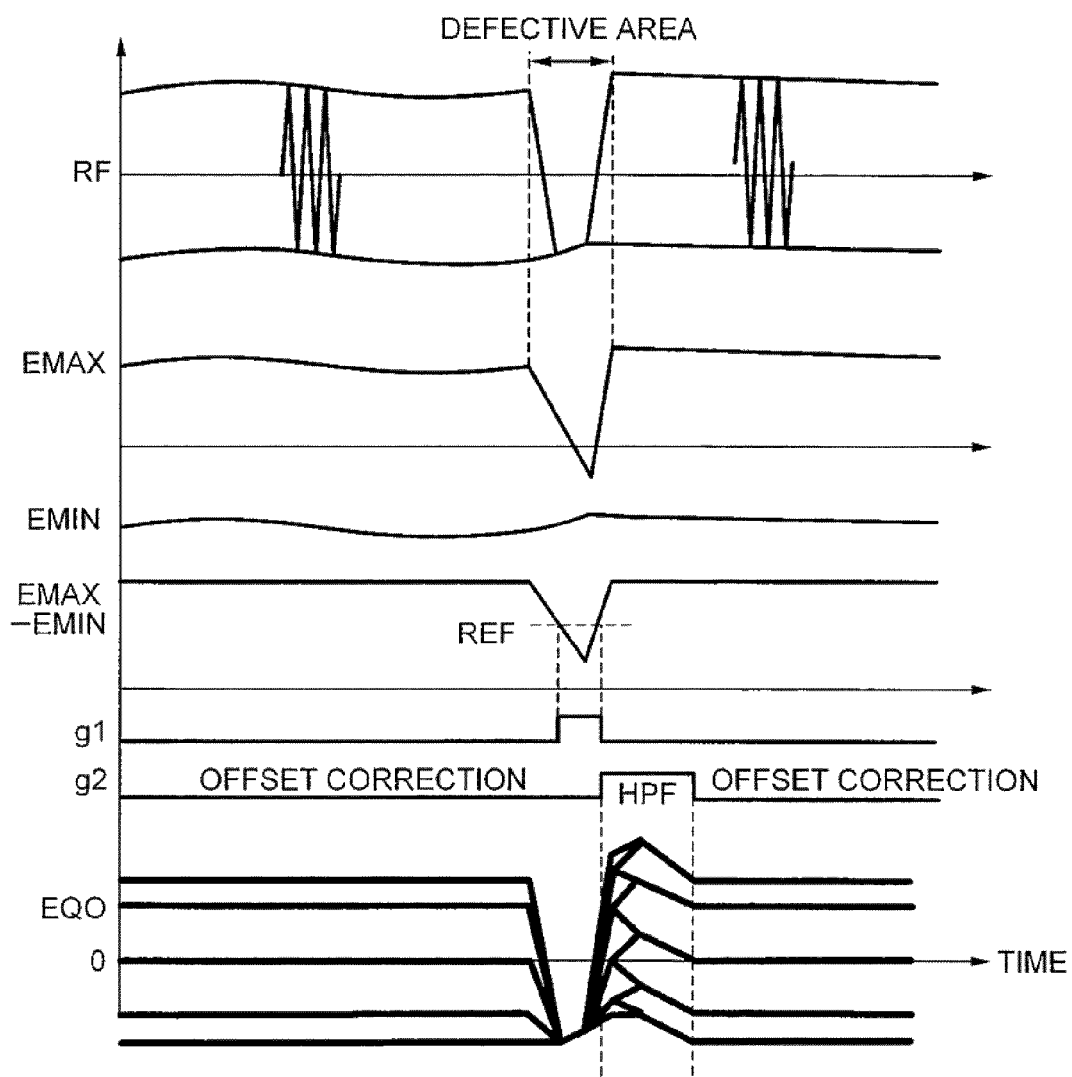
FIG. 8 is a waveform diagram showing a waveform of each part before and after passing through a defect.
Figure 9:
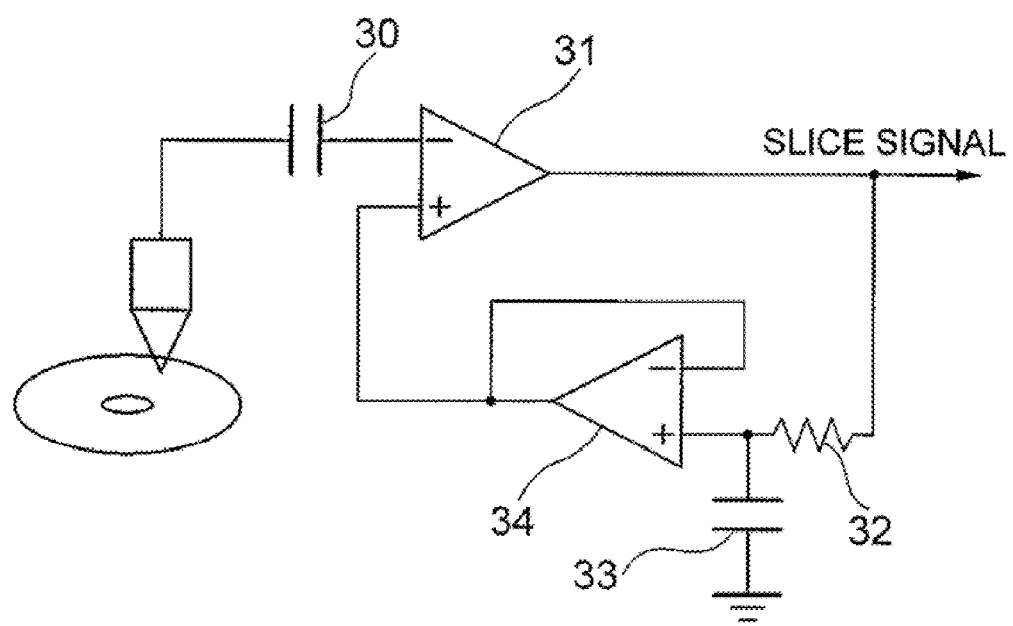
FIG. 9 is a block diagram showing the configuration of an automated slicer technique in the conventional technique.
Figure 10:
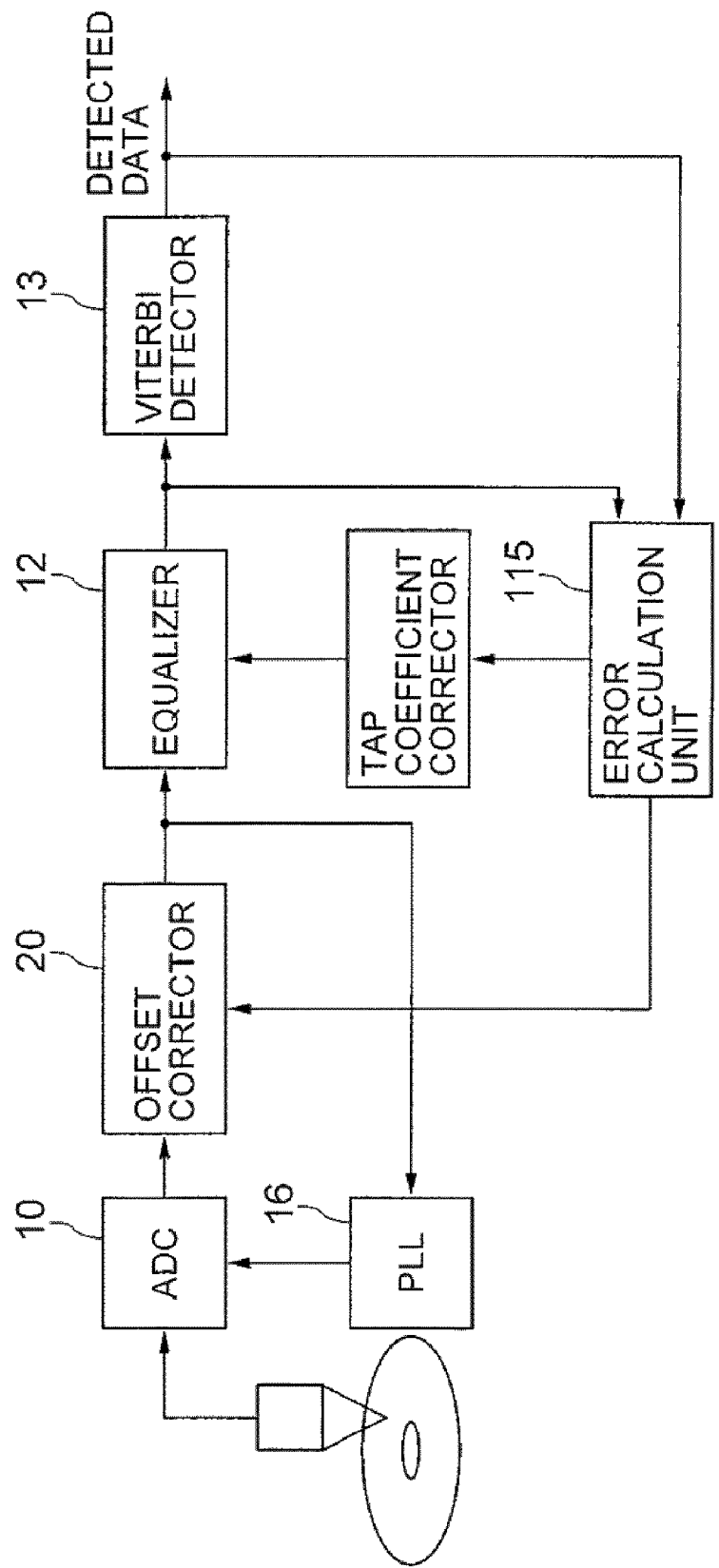
FIG. 10 is a block diagram showing the configuration of the conventional information readout apparatus including an offset corrector.
Figure 11:
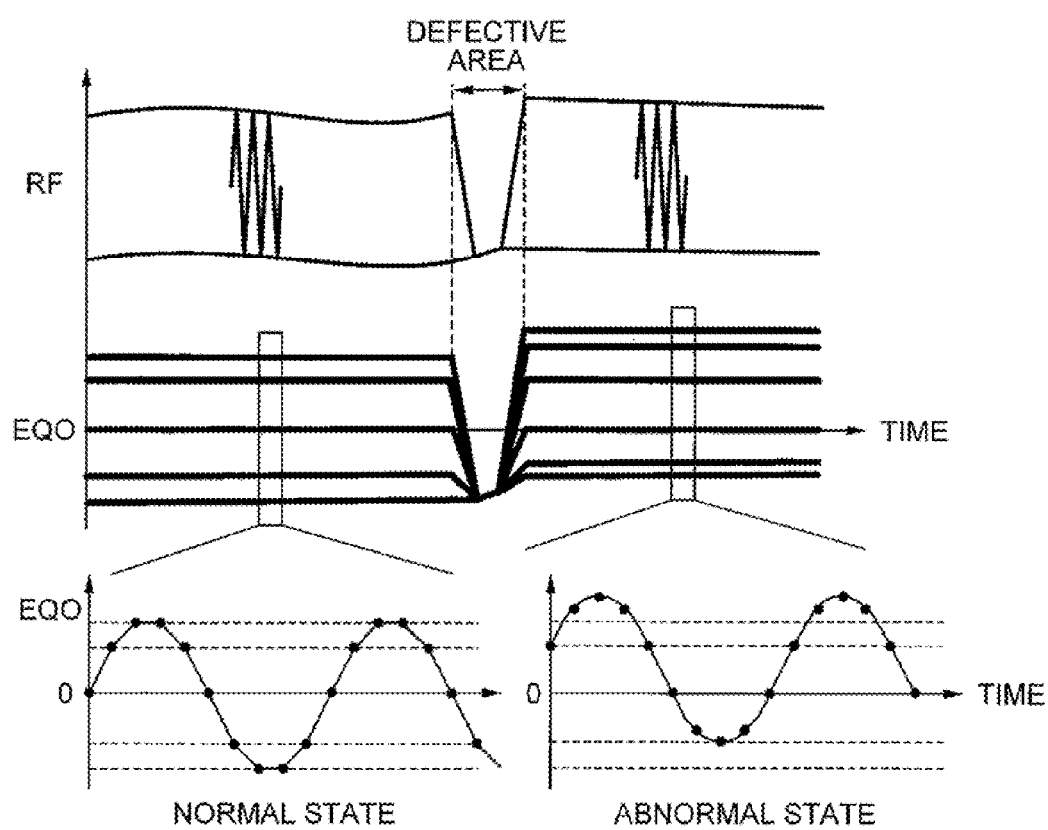
FIG. 11 is a waveform diagram showing waveforms before and after passing through a defect in the conventional technique.

FIG. 8 shows each signal upon passing through the defect in a time series. It is again assumed here that the Viterbi detection is performed in the PR (1,2,2,1) channel with the readout RF signal being a readout signal from the DVD. In the PR (1,2,2,1), the output EQO of the equalizer 12 is equalized to the level of five values including the central zero. When a read-out operation from the optical disk medium 18 (FIG. 1) is performed normally, the amplitude of the readout RF signal is significantly large, and the difference between the maximum envelope EMAX output from the maximum-value selector 141 (FIG. 6) and the minimum envelope EMIN output from the minimum-value selector 144 is larger than the reference value REF. In this state, the signal g1 output from the comparator 147 assumes a L-level, and the offset corrector 11 corrects the moderate DC fluctuation of the RF signal by using a level-correction operation.

In the defective area, the value of the maximum envelope EMAX becomes small because the amplitude of the readout RF signal assumes zero. When the difference between the maximum envelope EMAX and the minimum envelope EMIN becomes small to render the EMAX−EMIN smaller than the reference value REF, the comparator 147 shifts the signal g1 to a H-level. In response thereto, the gate-signal generator 15 (FIG. 1) shifts the signal g2 to a H-level for staying thereat during the specific period after passing through the defective area. The offset corrector 11 switches the operation thereof from the level-correction operation to the HPF operation due to the signal g2 assuming the H-level. In this way, divergence of the closed loop caused by the offset deviation can be prevented. Thereafter, when the signal g2 shifts to a L-level, the offset corrector 11 returns to the level-correction operation, thereby performing a DC tracking operation with a higher accuracy.

In the present embodiment, the offset corrector 11 is configured to switch between the level-correction operation that controls the offset so that the DC level of the shortest period signal included in the readout signal assumes the zero amplitude reference, and the HPF operation that controls the offset so that the DC level of the readout signal assumes the zero amplitude reference. The offset corrector 11 performs the offset correction by using the level correction operation during a normal reproduction, and switches the operation from the level correction operation to the HPF operation if the defect judgment unit 14 detects the waveform disturbance (defective area), to prevent divergence of the control system caused by the phase deviation. In this way, while the DC deviation caused by an asymmetry is corrected during the normal reproduction, divergence of the control system caused by occurring of the waveform disturbance can be prevented, whereby the stability of the readout signal can be assured even if there is a defective area. In addition, the digital configuration including the defect judgment unit provides a feasibility of integration to a LSI.

As described heretofore, the information readout apparatus of the present invention may have the following aspects.

The configuration thereof may be such that the offset corrector that performs the offset-correction operation can switch between the level-correction operation that controls an offset of the readout signal so that a DC level of the shortest period signal in the readout signal assumes a zero amplitude reference and the HPF (high-pass filter) operation that controls an offset of the readout signal so that a DC level of the readout signal assumes a zero amplitude reference. The readout signal for which the offset is corrected by the offset corrector is input to a maximum-likelihood detector, which identifies the binary data. In a normal reproduction, operation of the offset corrector is directed to the level-correction operation whereby the offset correction is performed so that the DC level of the shortest period signal matches the zero amplitude reference. On the other hand, if the defect judgment unit detects a waveform disturbance, operation of the offset corrector is switched to the HPF operation. This prevents a divergence of the control system caused by a phase deviation. Thereafter, when the waveform disturbance is ended to recover the normal reproducing state, operation of the offset corrector is returned to the level-correction operation for an accurate tracking operation. In this way, stable information reproduction can be achieved even in the case of occurring of the waveform disturbance due to a defect etc.

A configuration may be employed wherein the gate-signal generator inverts the polarity of the switching signal and maintains this state during a specific period just after detection of the disturbance or passing through the disturbance, when the defect judgment unit detects the disturbance of the readout signal. If there occurs a waveform disturbance in the readout signal due to a defect etc., a deviation of the sampling phase occurs to thereby identify a wrong detection data. Thus, if the operation of the offset corrector remains in the level-correction operation wherein the DC level of the shortest period signal assumes the zero amplitude reference, a DC deviation may be accelerated to accelerate the deviation of the sampling phase. In such a case, the gate-signal generator inverts the switching signal from a L-level to a H-level, for example, to allow the offset corrector to perform the HPF operation only during this inverted period, to thereby prevent the divergence of the control system caused by the phase deviation upon occurring of the waveform fluctuation.

A configuration may be employed wherein the maximum-likelihood detector includes a Viterbi detector that detects the binary data from the readout signal by using a Viterbi detection. In addition, a configuration may be employed wherein an equalizer that performs waveform equalization of the readout signal is provided at the preceding stage of the Viterbi detector.

A configuration may be employed wherein the offset corrector includes: a subtractor that corrects an offset deviation from the readout signal; an error-signal generator that generates an error signal, which is used in the level-correction operation, based on an input data of the Viterbi detector and the binary data detected by the Viterbi detector; a selector that selects and delivers the output of the subtractor or the error signal depending on the switching signal; and an integrator that integrates the output signal of the selector, to feed back the integrated result to the subtractor. In this case, the selector that selects the output signal of the subtractor to output the same to the integrator achieves the HPF operation. In addition, the selector that selects the error signal generated by the error-signal generator and outputs the same to the integrator achieves the level-correction operation.

A configuration may be employed wherein the error-signal generator includes a pattern judgment unit that identifies a specific pattern from the binary data, and an error-information output section that selectively outputs the error signal based on the detected result of the specific pattern by the judgment unit. As the specific pattern, a shortest period pattern, polarity inversion pattern or 1T-long patterns each preceding or succeeding to a polarity inversion may be employed. When the pattern judgment unit detects a pattern corresponding to the shortest period pattern etc., the error-information output section selectively outputs the error signal, whereby the level-correction operation that corrects the offset so that the DC level of the shortest period signal assumes the zero amplitude reference can be achieved.

A configuration may be employed wherein the error-signal generator includes: a replica generation section that performs convolution calculation of an impulse response of a PR channel defined by the Viterbi detector and the binary data to generate a replica signal; and an error calculation section that calculates an error between the input data of the Viterbi detector and the replica signal, and the error-information output section selectively outputs the error calculated by the error calculation section as the error information. The replica signal obtained by convolution calculation of the impulse response of the PR channel and the binary data corresponds to the input data of the Viterbi detector that originally generated the binary data, and the difference between the replica signal and the input data of the Viterbi detector represents the deviation (error) of the readout signal. The error-information output section selectively outputs the error generated by the error calculation section as the error information when the pattern judgment unit detects the specific pattern, whereby the offset corrector can correct the offset so that the DC level of the shortest period signal assumes zero amplitude reference. Note that since the replica signal and the input data of the Viterbi detector have therebetween a time difference corresponding to the internal delay time of the Viterbi detector, the input data of the Viterbi detector is delayed by a time length corresponding to the internal delay time of the Viterbi detector to match the replica signal in phase, upon calculation of the error.

A configuration may be employed wherein the error-signal generator includes a delay section that matches the input data of the Viterbi decoder with the binary data in phase, and the error-information output section selectively outputs as the error information the input data of the Viterbi decoder that is delayed by the delay section. In this case, when the pattern judgment unit detects the specific pattern, the error-information output section selectively outputs the input data of the Viterbi decoder output from the delay section as the error information, whereby the offset corrector can correct the offset so that the DC level of the shortest period signal assumes the zero amplitude reference.

A configuration may be employed wherein the offset corrector includes: a subtractor that corrects an offset deviation from the readout signal; a pattern judgment unit that identifies a specific pattern from the binary data; a replica generation section that performs convolution calculation of an impulse response of a PR channel defined by the Viterbi detector and the binary data, to generate a replica signal; an error calculation section that calculates an error between the input data of the Viterbi detector and the replica signal; an OR circuit that calculates a logical sum of the switching signal and a result of identification by the pattern judgment unit; a selector that selectively delivers the output of the error calculation section when the output of the OR circuit is true; and an integrator that integrates the output of the selector, to feed back the integrated result to the subtractor. In this case, when the gate-signal generator outputs the switching signal that instructs the HPF operation, the error output from the error-signal calculation unit is input to the integrator via the selector, and the integrator feeds back the integrated result to thereby perform the HPF operation that corrects the offset so that the DC level of the readout signal assumes the zero amplitude reference. In addition, if the gate-signal generator outputs the switching signal that instructs the level-correction operation, the selector selectively outputs the error generated by the error-signal calculation section at the timing at which the pattern judgment unit detects the specific pattern, thereby performing the level-correction operation that corrects the offset so that the DC level of the shortest period signal in the readout signal assumes the zero amplitude reference.

A configuration may be employed wherein the offset corrector includes a unit that switches a gain of a closed loop in the offset corrector, and the switching unit switches the gain of the closed loop based on the switching signal. The closed loop of the offset corrector may include a gain switching unit and have different gains between the case where the offset corrector performs the level-correction operation and the case where the offset corrector performs the HPF operation. In an alternative, it may have the same gain.

While the invention has been particularly shown and described with reference to exemplary embodiment thereof, the invention is not limited to these embodiments and modifications. As will be apparent to those of ordinary skill in the art, various changes may be made in the invention without departing from the spirit and scope of the invention as defined in the appended claims.

The present invention is suitable to reproduction from an optical disk that is recorded with a higher density, and also applicable to reproduction of CD/DVD.

The invention claimed is:

1. An information readout apparatus comprising:
   an offset corrector that performs a HPF (high-pass filter) operation that controls an offset of a readout signal so that a DC level of the readout signal assumes a zero amplitude reference, and a level-correction operation that controls an offset of the readout signal so that a DC level of a shortest period signal included in the readout signal assumes a zero amplitude reference, while switching therebetween;
   a maximum-likelihood detector that identifies binary data from the readout signal for which the offset is corrected by said offset corrector;
   a defect judgment unit that detects a disturbance of the readout signal based on a change of an envelope of the readout signal; and
   a gate-signal generator that generates a switching signal for switching operation of said offset corrector based on a detection result of the waveform disturbance by said defect judgment unit, wherein said offset corrector comprises:
   a subtractor that corrects an offset deviation from the readout signal;
   an error-signal generator that generates an error signal, which is used in said level-correction operation, based on an input data of said most-likelihood detector and the binary data detected by said most-likelihood detector;
   a selector that selects and delivers the output of said subtractor or said error signal depending on said switching signal; and
   an integrator that integrates the output signal of said selector, to feed back the integrated result to said subtractor.

2. The information readout apparatus according to claim 1, wherein said gate-signal generator maintains an inverted polarity of the switching signal during a specific period just after detection of said disturbance or passing through said disturbance, when said defect judgment unit detects said disturbance of the readout signal.

3. The information readout apparatus according to claim 2, wherein said offset corrector performs a HPF operation during a period of the inverted polarity of the switching signal.

4. The information readout apparatus according to claim 1, wherein said maximum-likelihood detector comprises a Viterbi detector that detects the binary data from the readout signal by using a Viterbi detection.

5. The information readout apparatus according to claim 4, further comprising, at the preceding stage of said Viterbi detector, an equalizer that performs waveform equalization of the readout signal.

6. The information readout apparatus according to claim 1, wherein said error-signal generator comprises a pattern judgment unit that identifies a specific pattern from the binary data, and an error-information output section that outputs said error signal based on the detected result of said specific pattern by said judgment unit.

7. The information readout apparatus according to claim 6, wherein said error-signal generator comprises: a replica generation unit that performs convolution calculation of an impulse response of a PR (partial response) channel defined by said most-likelyhood detector and the binary data to generate a replica signal; and an error calculation section that calculates an error between the input data of said Viterbi detector and said replica signal, and said error-information output section outputs the error calculated by said error calculation section as said error signal.

8. The information readout apparatus according to claim 6, wherein said error-signal generator comprises a delay section that matches the input data of said most-likelihood detector with the binary data in phase, and said error-information output section outputs as said error signal the input data of said most-likelihood detector that is delayed by said delay section.

9. The information readout apparatus according to claim 6, wherein said specific pattern is a shortest period pattern.

10. The information readout apparatus according to claim 1, wherein said offset corrector comprises a switching unit that switches a gain of a closed loop in said offset corrector, and said switching unit switches said gain of said closed loop based on said switching signal.

* * * * *